Dec. 16, 1947. H. C. McKAY ET AL 2,432,920
RADIATION-CONTROLLED RELEASE FOR AERIAL BOMBS OR OTHER LOADS
Filed April 29, 1942 7 Sheets-Sheet 1

Inventors
Herbert Couchman McKay
Anthony Martinek
Warren Dunham Foster
By
Warren Dunham Foster
Attorney Dec. 16, 1947. H. C. McKAY ET AL 2,432,920
RADIATION-CONTROLLED RELEASE FOR AERIAL BOMBS OR OTHER LOADS
Filed April 29, 1942 7 Sheets-Sheet 2

Inventors
Herbert Couchman McKay
Anthony Martinek
Warren Dunham Foster
By
Warren Dunham Foster
Attorney

Inventors
Herbert Couchman McKay
Anthony Martinek
Warren Dunham Foster

By

Attorney

Dec. 16, 1947.  H. C. McKAY ET AL  2,432,920
RADIATION-CONTROLLED RELEASE FOR AERIAL BOMBS OR OTHER LOADS
Filed April 29, 1942  7 Sheets-Sheet 6

Inventors
Herbert Couchman McKay
Anthony Martinek
Warren Dunham Foster
By Warren Dunham Foster
Attorney

Patented Dec. 16, 1947

2,432,920

UNITED STATES PATENT OFFICE 2,432,920

RADIATION-CONTROLLED RELEASE FOR AERIAL BOMBS OR OTHER LOADS

Herbert Couchman McKay, Eustis, Fla., Anthony Martinek, Allentown, Pa., and Warren Dunham Foster, Eustis, Fla.

Application April 29, 1942, Serial No. 441,006

6 Claims. (Cl. 102—4)

This invention relates to method and means whereby a bomb or other load may be released from a parachute or other aerial carrier, power driven or not, by radiant energy emanating either from a target or from a predetermined signal. Peferably we make use of releasing instrumentalities which are actuated by that type of radiation ordinarily known as infra-red.

The following illustration indicates one method in which our invention may be used for war purposes. According to this invention a unit may consist of a parachute preferably having a reflecting inner surface, a bomb, and means including our radiation-actuated control mechanism for detachably connecting the bomb and the parachute. This unit is released from an airplane a considerable distance from an industrial target or power house, for example, and in such a direction therefrom that the then prevailing wind will carry the unit toward the area or target. This release may take place a considerable distance away from the area to be bombed and hence beyond the scope of its primary antiaircraft defenses. Thus without endangering a valuable airplane and its crew such a destructive unit may be released and will float into the target area. It will be readily understood that in highly industrialized sections of an enemy country, as for example a steel making region, there are ordinarily many targets each of which contains one or more sources of radiation. As soon as such a unit passes over a target including a source of radiation such, for example, as a steel mill, our radiation-responsive control mechanism will be actuated and the bomb will fall. Either no warning will have been given up to the time the bomb strikes or a warning having been given some time previously on account of the presence of the plane which has released the unit it will have been thought that no raid is taking place since the plane will have disappeared. Consequently the element of surprise is added to the destructiveness of the bomb. Under such conditions, no effective defense measures are possible.

In a large majority of industrial establishments, some source of extensive heat radiation is placed near its center. It will be understood that while this bomb is ordinarily released directly above the source of radiation the unit being airborne and not powered is moving so slowly that the bomb will strike within a comparatively few feet of the source of radiation which causes its release and probably well within the area within which the detonation of a high explosive bomb is destructive to the source of radiation itself as well as to the surrounding factory buildings. Even if the source of radiation itself is not directly struck it is highly probable that a considerable portion of an industrial installation which is served by a power house, for example, which causes the radiation will be destroyed.

While it is impossible to direct a parachute so that it will directly pass over any given object at a distance of say 15 or 20 miles from its point of release, it should be remembered that in the majority of industrial areas there are many sources of radiation each associated with an important industrial or other establishment. Consequently if a unit should miss one such target the chances of its passing over and being released above another are extremely good. It also should be noted that in any urban area, for example, there are many closely spaced sources of radiation connected with important industrial and other establishments. In fact no better indication of areas of importance to an enemy can be found than sources of radiation of large amounts of heat. While it is probable that a considerable number of bombs released by our mechanism may not strike a specific target for which they are intended, release will always occur over some source of heavy radiation, in almost all instances an establishment of importance, and whatever loss of bombs may occur through release over an unimportant target will be more than outweighed by saving of bombers and lives of their crews.

An important element of this invention is the preferred use of method and means which restrict the response of the device to radiation which originates from a point substantially directly beneath the bomb or other load.

According to another preferred embodiment of this invention release may be selective in that this unit does not respond to a first source of radiation but to a later source in selected sequence to the original source.

Another object of this invention is to provide a radiation-responsive releasing mechanism having a predetermined threshold so that it is responsive only to signals of a given intensity. One of our control mechanisms so equipped, for example, if desired would not be released by a locomotive but would be by a power house.

If desired, both the parachute and the releasing mechanism may be automatically destroyed at the moment of the automatic release of the bomb carried thereby thus adding the element of mystery to that of surprise.

While we are describing this invention as applied to a parachute it may be used in connection with any other aerial carrier, power driven or not, as for example a glider, airplane or driven or non-driven lighter-than-air craft.

An illustration of the use of our invention for peaceful purposes is in connection with the dropping of any load, such for example as a bag of mail, attached to a parachute, from any aircraft preferably an airplane. Such release would be in response to a fixed and predetermined signal. In such war use as first outlined in which the unit includes a parachute, our actuating mechanism of course would be destroyed. In such instances as stated immediately above, however, our releasing mechanism would be permanently attached to and electrically powered from an aircraft and not released with the load and hence could be used repeatedly. An advantage of this application of our invention is that radiation-responsive controlling mechanism can be more cheaply made and operated than radio devices and, even more important, does not require skilled operation.

A highly important object of this invention is the provision of rugged, light and cheaply constructed control apparatus actuated by radiant energy such as that generally known as infra-red.

Other objects, advantages and characteristics of this invention will be apparent from the foregoing portion of this description, the portion of the specification which follows, the subjoined claims and attached drawings. It will be understood, however, that changes can be made from that which is shown herein for purposes of illustration only without departing from the spirit of the invention or the scope of our broader claims.

In the drawings, all of which are schematic:

Figures 3 to 6 inclusive show various optical arrangements of which use may be made.

Figure 13 illustrates how our releasing mechanism and parachute may be destroyed when a bomb is dropped therefrom, Figure 13a being a fragmentary enlarged detail of a firing device for this purpose.

Figure 13b is a fragmentary detailed view largely in section showing means for cushioning the shock of release of this unit.

Figure 14 is a partial top plan view corresponding to Figure 13 and showing means for destroying a parachute after its load has been dropped.

Figure 15 is a view largely in section showing how our connecting mechanism and parachute may be disposed within a tail assembly of a bomb.

Figure 15a shows a damper of a type similar to that shown in Figure 13b but particularly applicable to the structure of Figure 15.

Figures 1, 2, 2A:
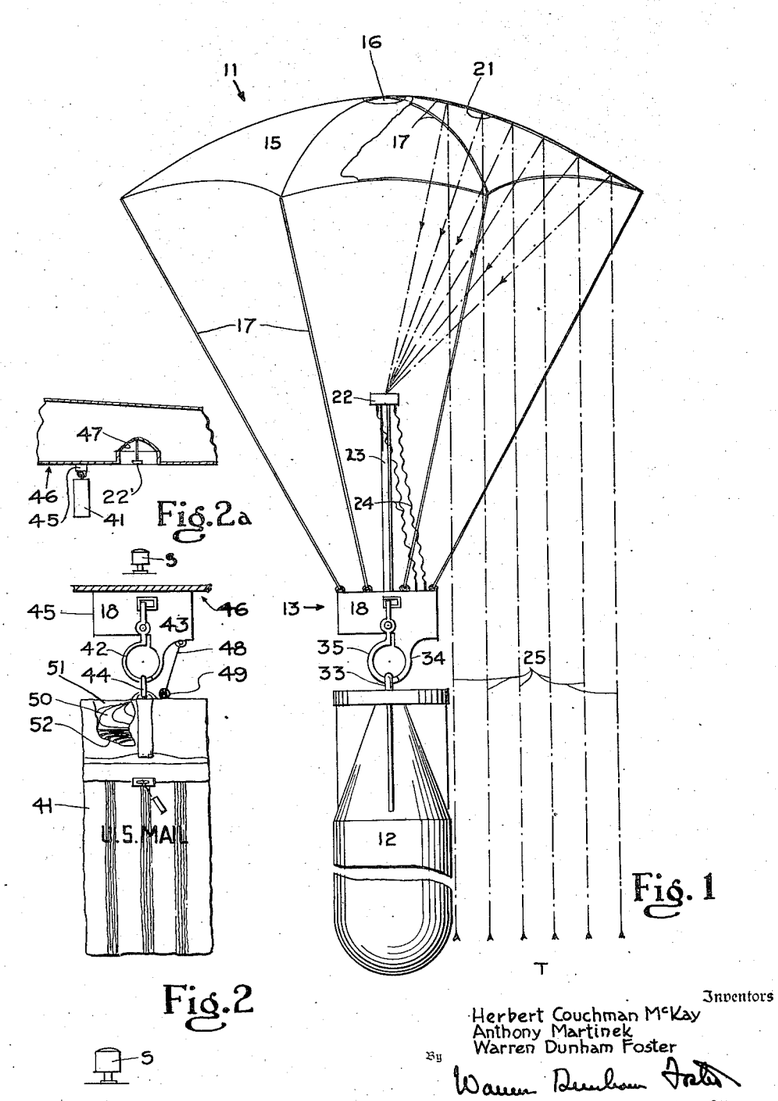
Figure 1 illustrates a complete unit of parachute releasing mechanism and bomb.
Figure 2 is a fragmentary sketch showing a peace-time load supported by our unit, specifically a mail bag.
Figure 2a is a fragmentary view showing such a unit with its releasing mechanism built within an airplane.

As is best shown in Figure 1, our unit consists essentially of a parachute generally indicated as 11, a bomb or other load generally indicated as 12, and an automatic releasing mechanism generally indicated as 13.

The bomb to be carried and automatically released per se forms no part of this invention and hence need not be described. If desired, use may be made of incendiary bombs of the types described and claimed in the co-pending application of applicants McKay and Martinek Serial Number 442,364 filed May 9, 1942.

The parachute may consist of a canopy 15, vent 16 and shrouds 17 which cross the vent and are carried from the edges of the canopy downwardly as viewed in the drawings to a small housing 18 which contains or supports our control mechanism.

If desired for use with relatively light bombs, these parachutes may be of the type which are specifically described and claimed in the co-pending application of applicants McKay and Martinek Serial Number 444,916 filed May 28, 1942, and in the application to which reference is made therein. Since for most purposes the bombs to be carried according to this invention are of a demolition type of relatively great weight it will generally be desired to use parachutes of a more conventional and substantial construction. Since each parachute, however, is to be used but once and for a relatively short period a material such as a light tight-woven fabric of cotton such as percale, for example, may be employed instead of silk or nylon.

Our releasing unit consists in essence of the reflecting inner surface of a parachute, a radiation-responsive cell actuated by rays from a target impinging upon such cell, mechanism for detachably connecting the bomb and parachute, and electrical instrumentalities operated by the cell under impact of radiation so reflected from the target for operating said mechanism thereby releasing the bomb.

The inner surface 21 of canopy 15 is coated with aluminum paint or other highly reflective substance so that radiation from a target T will be directed, with or without interposition of a secondary reflector, from the interior of the parachute to an actuating member or cell 22 of our control apparatus shown in Figure 1 as supported upon housing 18 by a strut 23 and electrically connected thereto as by a circuit 24 which in practice is enclosed within or attached to the strut.

Any desired optical arrangement may be employed such, for example, as those shown in Figures 1 and 3 to 6 inclusive.

Figure 3:
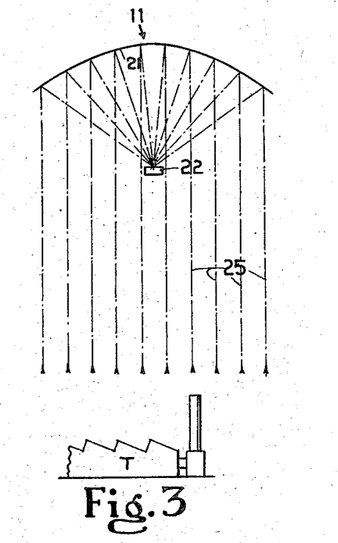
Figure 3 illustrates an actuating member positioned at the focal point of an inner reflecting surface of a parachute.
Figure 4:
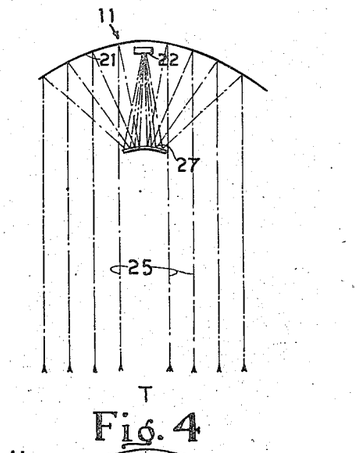
Figure 4 shows an optical arrangement in which a secondary convex collecting reflector is positioned adjacent the focal point of a primary reflector carried by a parachute and an actuating member disposed adjacent the point of focus of the rays from this secondary reflector.

As is shown in Figures 1 and 3, rays 25 from target T are directed by reflecting surface 21 of parachute 11 upon actuating member 22, which is later more definitely characterized. Alternatively as shown in Figure 4 such rays 25 may be reflected by primary surface 21 to a second convex reflector 27 disposed within the focus of the primary reflector. This secondary reflector may be of one of the newer types of highly reflecting speculum metals by which these rays are directed upon actuating member 22.

Figure 5:
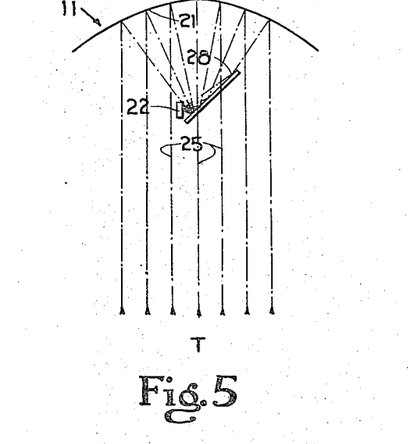
Figure 5 shows an oblique mirror positioned adjacent the focal point of a primary reflector and directing radiation upon a cell disposed adjacent thereto.

Figure 5 shows an arrangement by means of which rays 25 are reflected by primary reflector 21 to a secondary plane mirror 28 which may be of the same material as that of convex mirror 27 and by it upon actuating cell 22. This arrangement is mechanically convenient, but mirror 28 blocks a relatively greater portion of the signal than do secondary reflectors of the other types disclosed.

Figure 6:
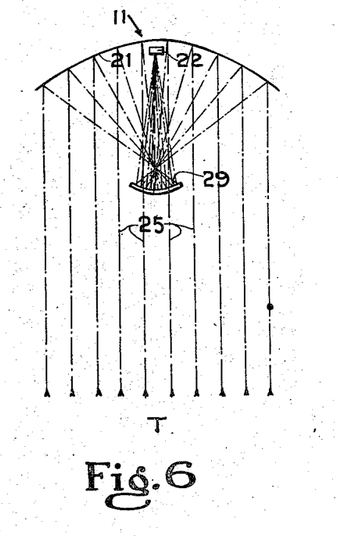
Figure 6 corresponds to Figure 4 but shows use of a convex instead of a concave reflector.

Figure 6 shows a structure corresponding to that of Figure 4 except that a concave mirror 29 is used to collect rays 25 which are directed to it by primary reflector 21 and by it to cell 22. It is to be understood that this secondary reflector is placed slightly forwardly or toward the primary reflector from the point of focus of the primary reflector and that the actuating member or cell 22 is placed adjacent the point of focus of rays directed toward it by the secondary reflector.

Figure 7:
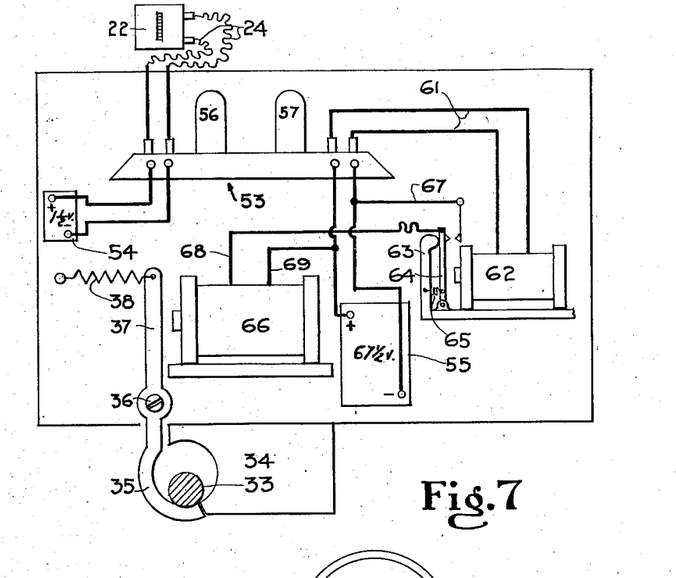
Figure 7 shows electrical circuits and mechanisms which may be employed to accomplish the results of this invention, an amplifier and relay being employed between a thermo-couple and a relay which operates a release.

By electrical instrumentalities which are later described radiation which falls upon cell 22 is effective to cause the release of bomb 12 or other load. As shown in Figure 1 and Figure 7 (and also in Figures 2, 8, 13 and 16) bomb 12 is supported as by a ring 33 attached to a tail assembly thereof which in turn is supported by a split ring including a fixed member 34, which may be formed with or attached to casing 18 and extends downwardly therefrom, and a movable member 35. This movable component of the split ring forms a lower portion of a bar, pivoted as at 36, the upper portion of which as seen in Figure 7 is an armature member 37 operated as is later described. Premature release of the split ring is prevented by a spring 38 which can be light since the force exerted through loop 33 by the load is not directly against the releasing device.

As is shown in Figures 2 and 2a any load such as a mail bag 41 instead of bomb or other weapon 12 may be released as herein described and claimed. A split ring having a movable portion 42 and a fixed portion 43 attached to a ring 44 fastened to the load may be opened by a control mechanism 45 permanently attached to an airplane 46 and operated therefrom, and also preferably housed therein, such control mechanism being of the type fully described hereinafter and claimed herein. It will be understood that in such circumstances a reflector 47 analogous to that 21 formed in the inner surface of the parachute 11 must be provided so that it directs rays from a signal S to a cell 22'. Such a signal may be a high intensity search light of a reflector as distinct from a condenser type with a coil or infrared lamp in place of an ordinary filamented lamp. As shown in Figure 2a this reflector 47 may if desired be positioned a considerable distance from a point upon the carrier at which a load is actually released. As the mail bag is released, a rip cord 48 attached to a ring 49 upon a parachute 50 housed within a compartment 51 in the upper portion of bag 41 causes the parachute to unfold and by shrouds 52 attached to ring 44 to support the load. It will also be understood that under some circumstances a bomb or other weapon may be directly supported by a powered aircraft as shown in Figures 2 and 2a and released by mechanism herein described.

In the claims hereof, the word "load" is to be understood to include a bomb or load military or civilian in purpose, of any desired material.

Reference to Figures 7 to 10 both inclusive will show means whereby an impulse which is received by cell 22 (or 22') may operate split ring 35 (or 42) to drop a bomb or other load.

As shown in Figure 7 circuit 24 leads from a cell 22, preferably a thermo-couple of a type described and claimed in the co-pending application of the applicant McKay, Serial Number 509,530 filed November 8, 1943, to an amplifier generally indicated as 53. Plate voltage is supplied by dry battery 54 and filament voltage by a dry battery 55. Battery 55 may be of a type widely used in portable radios and weighs slightly over one pound. The weight of battery 54 is negligible. Tubes 56 and 57, which are likewise small and inexpensive, complete this assembly, all of which may be conveniently packed in a paste board or other carton not over 3 x 3 x 4½ inches in dimensions and weighing not over two pounds. While we are not limited to any particular type of tubes we may prefer to use as 56 and 57 those known in the trade as 1S5 and 1S4 respectively.

By a circuit 61 amplifier 53 may be connected to a relay 62 operating an armature 64 normally held in inoperative position against stop 63 by a spring 65. Upon the operation of relay 62 operating relay 66 will be actuated by the completion of a circuit through lead 67 contact points of relay 62, lead 68 and lead 69 back to battery 55. Such operation will cause armature member 37 of split ring 35 to be moved to the right as shown in Figure 7 thereby releasing ring 33 and bomb 12.

Figure 8:
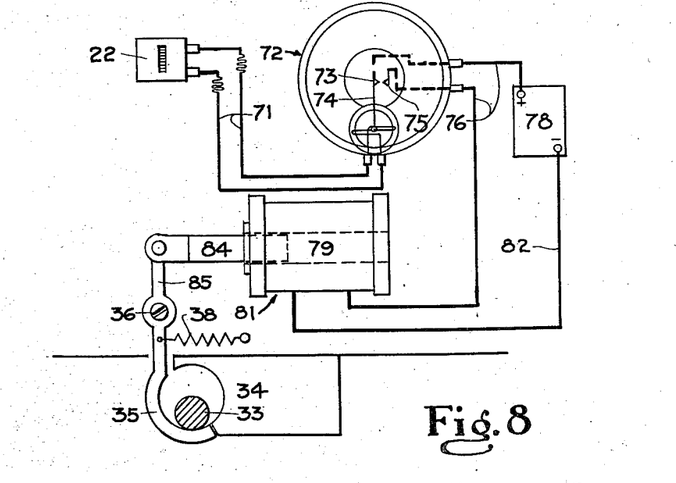
Figure 8 shows an alternative electrical network in which a sensitive relay without an amplifier directly operates a solenoid which controls a release.

An alternative structure is shown in Figure 8. Cell 22 as by a circuit 71 is connected to a sensitive relay 72 which may be of the meter type. Upon the actuation of cell 22 following the impact of radiation from target T current flows through leads 71 which correspond to leads 24 of Figures 1 and 7 thereby causing a contact 73 carried by arm 74 to engage contact 75 thereby completing circuit 76 one leg of which goes to a battery 78 and the other leg of which is connected to winding 79 of a solenoid generally indicated as 81, this winding by lead 82 also being connected with battery 78. When this connection is established armature 84 will be moved to the right as shown in Figure 8 thereby moving arm 85 of split ring 34—35 thus freeing a bomb or other load.

Figure 9:
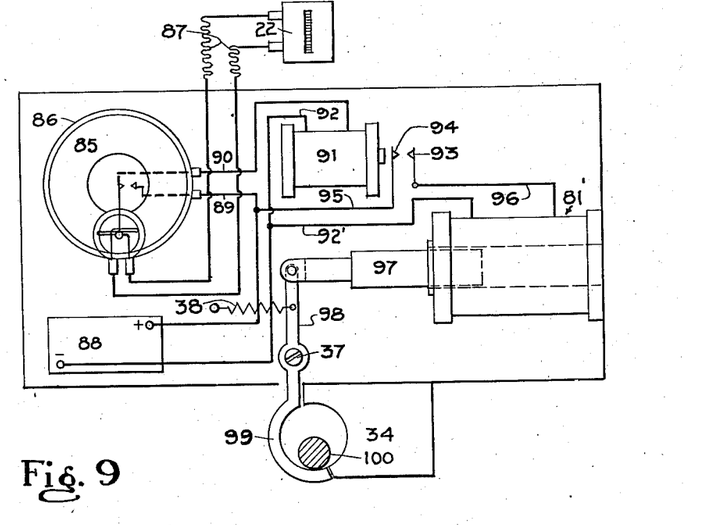
Figure 9 corresponds to Figure 8 but shows a relay in a position between a sensitive relay of the so-called meter type and an armature of a releasing device.

Figure 9 shows an alternative construction in which a relay is interposed between sensitive relay 72 and solenoid 81.

Cell 22 may be connected to a sensitive relay 85 of the meter type positioned within housing 86 by a circuit 87. Relay 85 may correspond in all respects to relay 72 previously described. It is fed from a dry battery 88 through a lead 89 and through lead 90 connected to a relay 91 which through lead 92 likewise is fed from dry battery 88. When cell 22 responds to radiation, current will pass through relay 85 thereby closing circuit 89—90 and the circuit to relay 91. This relay thereupon brings contact 93 into engagement with contact 94 and thus completes a circuit from battery 88 through lead 95 contacts 94 and 93 and leads 96 and 92' with the coils of solenoid 81' thereby sucking armature 97 therewithin and rotating the movable portion 98 of split ring 99 upon its pivot. Such movement releases a loop 100 attached to a bomb 12 not shown which thereupon is dropped.

Figure 10:
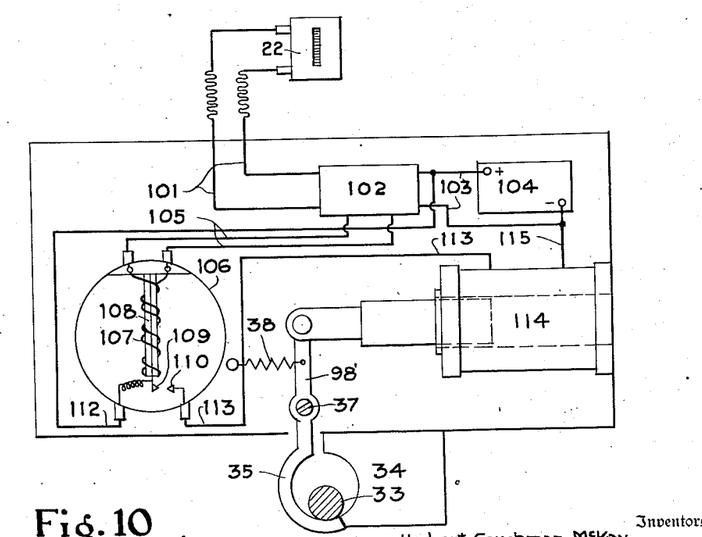
Figure 10 shows still another type of circuit in which a relay of a thermostatic type and an amplifier are employed.

Figure 10 shows an alternative construction in which a relay of the thermostatic type is used in place of sensitive relay 72.

A circuit 101 leads from thermo-couple 22 to an amplifier 102 which is fed by a circuit 103 from a power supply 104 which may correspond to batteries 55 and 78 previously described. By circuit 105 amplifier 102 is connected with thermostatic relay 106 operated by a coil 107 surrounding a core 108, composed of materials of different thermal characteristics, so that upon heating contact 109 is brought into engagement with contact 110. Thereupon a final control circuit is completed from battery 104 through lead 112, contacts 109 and 110, lead 113 to windings of a solenoid or relay generally indicated as 114 and through lead 115 back to battery 104. Solenoid or relay 114, like solenoid 81 or relay 66, may be employed to operate the above described or other desired releasing mechanism, an arm 98' pivotally attached to the core of relay 114 rotating split ring 35 upon pivot 37 thereby releasing ring 33 and its load.

From the above description it will be understood that when any of the thermo-couples 22 are actuated by radiation impinging thereupon from a target which radiates heat or a predetermined signal a solenoid or relay will be operated so that a bomb or other load will be dropped.

Figures 11, 12, 18, 18A:
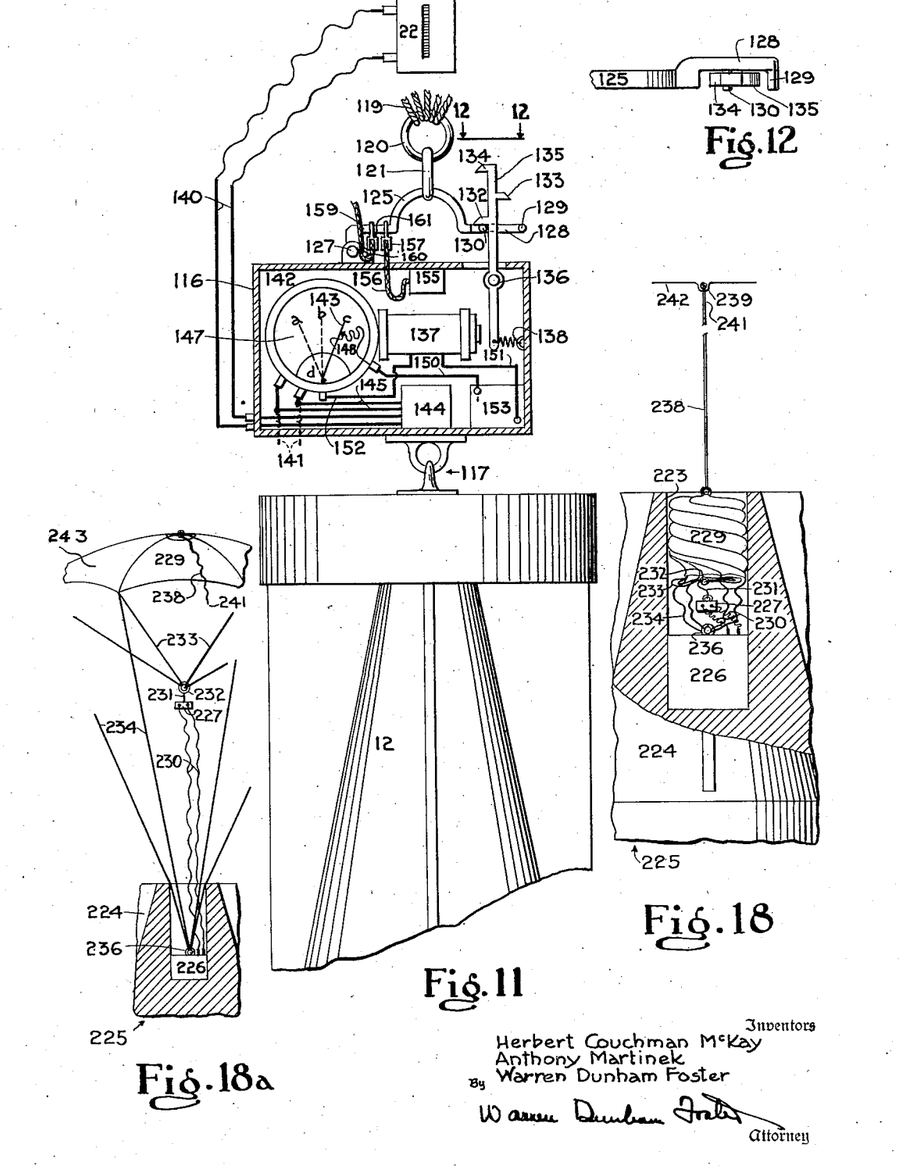
Figures 11 and 12 illustrate a construction in which our device is selectively responsive to radiation successive to that which first strikes it, Figure 12 being a fragmentary top plan view of Figure 11.
Figure 18 (Sheet 5) is a view partly in section corresponding to Figure 16 but showing a variation thereof, our releasing mechanism with the exception of cell and reflective lining of the parachute being permanently assembled with a bomb and destructible upon the detonation thereof and the cell being supported by auxiliary shrouds.
Figure 18a (Sheet 5) is a reduced view corresponding to Figure 18 showing the unit with parachute extended.

In the form of the invention shown purely diagrammatically in Figure 11 and in Figure 12 simple selective release is provided by means of which it is possible to drop a bomb or other load upon a selected target after the parachute has passed over a plurality of radiating sources which it is not wished to attack. Another important difference is that a housing 116, corresponding to 18 previously described, is releasably connected with a parachute and a bomb 12 fixedly attached to the housing. Thus the releasing mechanism falls with the bomb and is destroyed therewith.

This housing is fixed to a bomb 12 by rings 117. The housing is releasably attached to a parachute not shown by shrouds 119 which are fastened to a ring 120 which in turn as by a loop 121 is detachably connected to a hook 125. When an end of this hook is released, the loop slips off of it and bomb and mechanism fall. This hook 125 may be pivoted as at 127 and terminate rightwardly as seen in the drawings in a formation 128 which has two teeth 129 and 130 respectively which extend at right angles in a horizontal plane and coact with stops 132, 133 and 134 formed in or attached to and extending from a control bar 135 pivoted at 136 upon housing 116. Movement of the upper portion of this control bar to the right as viewed in the drawings will release tooth 130 from stop 132 and will cause tooth 129 to engage with stop 133 as the weight of the load attached to case 118 causes it to fall by gravity. Movement of the upper portion of control bar 135 to the left however will disengage tooth 129 from stop 133 and cause the engagement of tooth 130 with stop 134. A subsequent movement of the upper portion of this bar to the right will release tooth 130 from stop 134 and permit hook 125 to escape from ring 121 under the weight of the load thereby releasing the bomb. Any reasonable number of stops may be provided.

To cause the above movement, an electromagnet 137 is provided of which the lower portion of pivoted bar 135 is the armature, a spring 138 serving to bring or hold the armature bar 135 in the position shown in the drawings. Actuation of magnet 137 by cell 22 and the electrical instrumentalities actuated by it therefore cause the armature bar to move to the left thus releasing tooth 130 from stop 132 while spring 138 is effective to remove tooth 129 from stop 133 thus permitting stop 134 to hold tooth 130. Thus it will be seen that case 116 and its load remain fixed to the parachute until electromagnet 137 has operated a second time. It will be readily understood that any number of stops may be provided upon the upper end of armature bar 135 so that the final release of the bomb from the parachute may take place after the parachute has passed over any given number of sources of radiation. If more than a few additional stops are added, the upper portion of bar 135 must be generally arcuate.

The electrical circuits by which the above electromagnet is operated may be such as have been shown previously, or the simple arrangements of Figure 11 may be employed. From cell 22, leads 140 may proceed directly as by an extension 141 indicated in dotted line to a sensitive relay 142 of a usual galvanometer type such as 72 or 85 previously described. For some purposes, notably response to radiation of considerable magnitude, this cell will act without amplification. For other purposes, however, amplification may be provided. In such cases circuit 140 may extend to an amplifier 144 which may be of the type shown in Figure 7, which in turn by leads 145 feeds galvanometer 142. Lines $a$—$d$, $b$—$d$ and $c$—$d$ indicate positions of relay needle 143 when responsive to signals of various strengths. It will be understood that under impulse of a signaling current, the relay needle 143 is moved so that it occupies the various positions indicated by these lines, its movement to inoperative position being limited by stop pin 147. A contact 148, which consists of a relatively soft wire, may be adjusted manually so that the circuit will be completed at any desired signal strength. This adjustment may be very easily made as by a pair of small pliers or a more elaborate device may be used, but since the relay is to be used but once refinements are not necessary. A scale indicates the points to which the wire leading from the contact 148 can be moved to be operative at the various signal strengths. Adjustment of this wire to its extreme position, namely that shown in Figure 11, will limit response of this device to signals of only relatively great strength.

In case amplification is required it can be secured from tubes which together with activating batteries measures about 3 x 4 x 4½ inches and weigh less than two pounds. We may prefer to make this amplifier, if one is used, independent of the power source operating the electromagnet.

As will be readily understood from a consideration of Figure 11, when needle 143 makes contact with point 148 through leads 150, 151 and 152 a circuit is completed between the electromagnet 137 and its battery 153 which is disposed in case 116.

From the above described construction it will be clear that when radiation of a predetermined intensity strikes cell 22, sensitive relay 142 operates the electromagnet 137 and the support of the case 116 by ring 121 will be broken thereby causing the bomb 12 to drop.

If desired the above assembly can be inserted between parachute and bomb with the other side up, so to speak, so that it will remain attached to the parachute instead of falling with the bomb. For most purposes it will be desirable however for it to fall with the bomb so that the entire control mechanism will be demolished. Also, when a large bomb is to be employed, all of the above mechanism may be assembled within its tail.

In Figures 11, 13, 13a and 14 we illustrate how, if desired, positive means may be employed to destroy both our radiation-responsive connecting mechanism and the parachute.

As will be observed from a consideration of Figure 11, a small explosive charge 155 may be placed within casing 116 which may be fired by a slow match 156 which is inserted within an igniter assembly 157 attached to hook 125. As will be observed sufficient slack is provided so that fuse 156 does not become taut until hook 125 is moved to its most upward position upon the release of the connective mechanism. Thereupon fuse 156 is jerked from igniter 157 and immediately is ignited and burns to explosive 155 thereby destroying casing 116. In order that the parachute may likewise be destroyed, we may provide a quick match 159 looped about a pin 160 and fired by an igniter 161 likewise attached to hook 125. As with igniter 157 the inoperative movements of hook 125 are without effect upon the igniter but when it is finally moved to its releasing position quick match 159 will be jerked from igniter 161 and the parachute fired. Quick match 159 may be arranged as described in greater detail immediately below.

Figures 13, 13A, 13B, 14, 15, 15A:
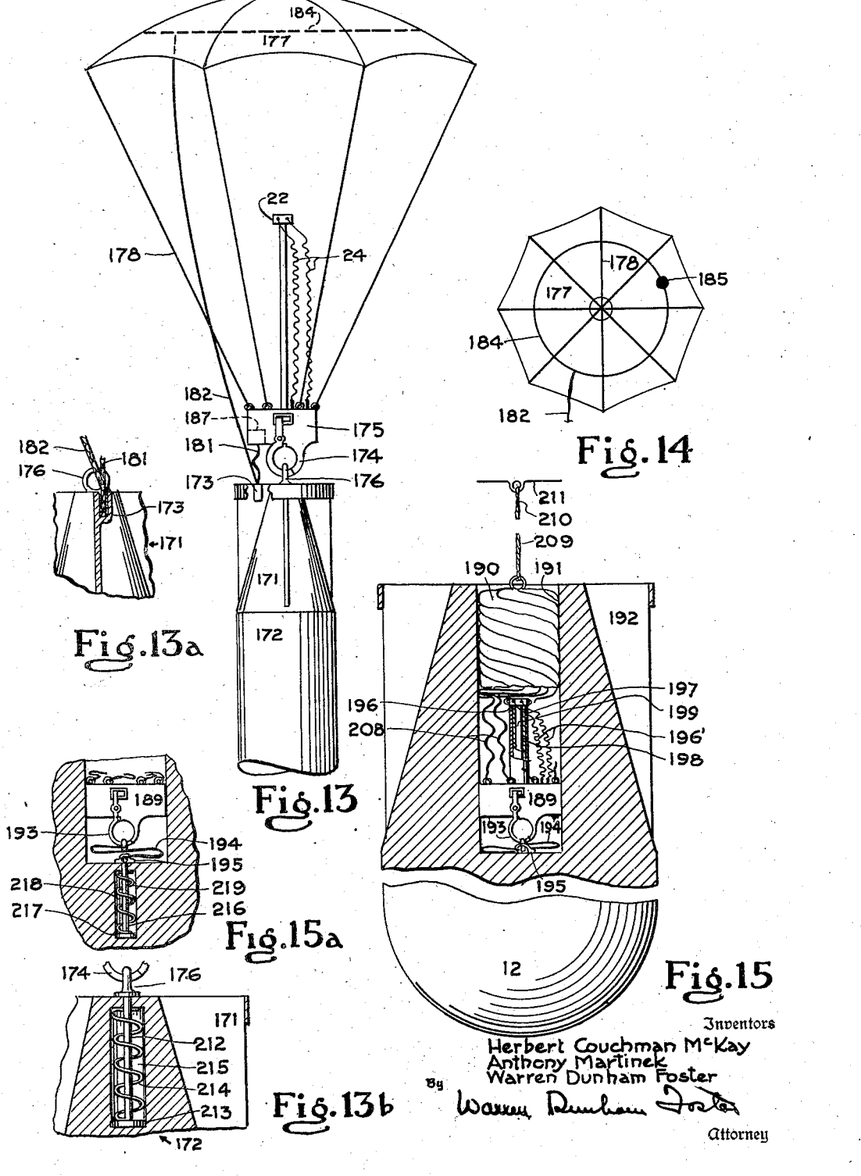

As shown in Figures 13 and 13a in tail assembly 171 associated with bomb casing 172 we may mount an igniter 173. This bomb is detachably connected by a split ring 174 which may be constructed as previously described to a housing 175 in which is positioned automatic releasing mechanism similar to that described above. By reason of this construction it will be noted that when split ring 174 is released a ring 176 attached to the tail assembly will slip off and the load will fall, the automatic releasing mechanism, however, remaining with the parachute 177 to which it is attached as by shrouds 178. As the bomb falls away from the parachute and releasing mechanism, a slow match 181, which is inserted in igniter 173, will be jerked therefrom and will begin to burn. Connected therewith is a quick match 182 which leads to an ignition ring 184 placed upon parachute 177 and including an ignition patch 185. As a consequence when quick match 182 burns to the parachute it will be completely destroyed. Slow match 181 leads to a small explosive charge 187 placed within casing 175 the detonation of which will destroy the timing mechanism so that no clue will be given to the enemy as to the mechanism by means of which these bombs are mysteriously dropped upon selected radiating targets.

It will be understood that the destructive device of Figure 11, so far as the parachute is concerned, may be arranged as shown in Figures 13 and 14. The same or corresponding destructive devices may be employed in connection with the other arrangements of the three elements which make up a combination of this invention.

Figures 16, 17:
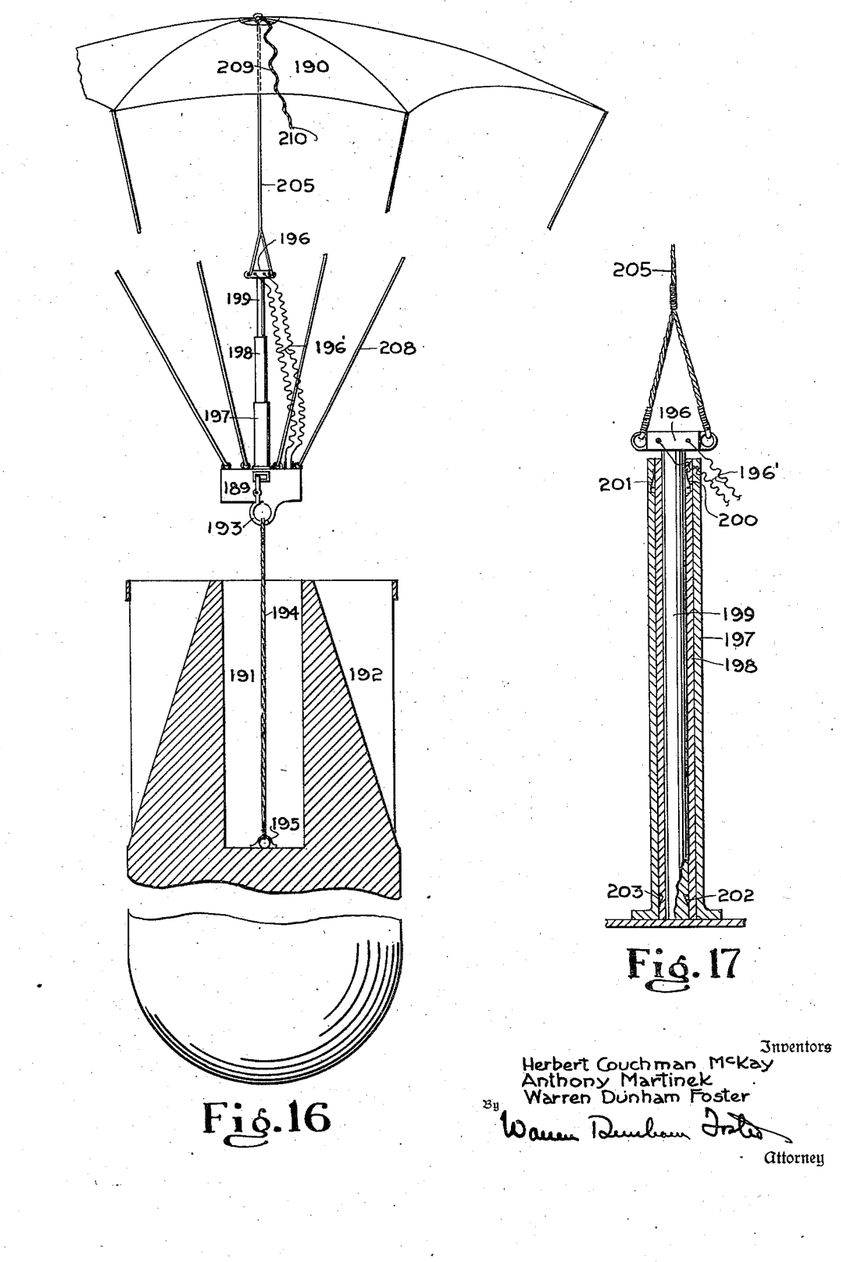
Figure 16 is a view partly in elevation and partly in section corresponding to Figure 15 but showing a unit after release from a carrier.
Figure 17 is a detailed view partly in section and partly in elevation of a portion of the subject matter of Figure 15 and Figure 16 and showing an extensible support for a radiation-responsive cell.

As is best shown in Figures 15, 16, and 17, provision may be made for temporarily housing a case 189 containing our detaching mechanism and a parachute 190 within a special compartment 191 formed within a tail assembly 192 of a bomb 12. This construction per se is shown and claimed in the co-pending application Serial Number 444,916 filed May 28, 1942, of applicants McKay and Martinek.

A split ring 193 by means of a short cable 194 is attached to a ring 195 formed at the bottom of compartment 191. In order to extend a cell 196 and if desired also a secondary reflector of a type such as is shown in Figure 4, 5 or 6 to the focal point of the reflecting lining of a parachute, collapsible and nesting tubing is arranged by means of which as the parachute is drawn upwardly the cell is raised to a proper position. A cable 196' electrically connects cell and the device actuated thereby. An outer tube 197 may extend from within casing 189 to a point thereabove and have nested within it as is best shown in Figure 17 an inner tube 198 within which in turn a rod 199 is positioned. Latches 200 and 201 respectively cooperate with notches 202 and 203 respectively to hold tube 198 and rod 199 in extended relation to each other and to tube 197 after they have been pulled out.

A cord 205 is passed through an appropriate opening in cell structure 196 and attached to parachute 190. Shrouds 208 extend from parachute 190 to casing 189, as previously shown and described. The parachute in turn by a cord 209 having a weakened section 210 is attached to an aircraft 211 (Figure 15).

The operation of this embodiment of our invention is as follows:

As a unit including a bomb 12 is released from aircraft 211 it is as shown in Figure 15. Thereupon cord 209 first pulls parachute 190 out of compartment 191 and thereupon cord 205 extends the nested tubes and rod making up the support for cell 196 while shrouds 208 pull casing 189 from the compartment and make taut cable 194 from which the bomb is suspended. Thereupon by the weight of the bomb cord 209 is broken at its weak point 210 so that no end thereof dangles from the aircraft. As shown in Figure 16, parachute 190 supporting bomb 12 floats away with the radiation-responsive control mechanism properly positioned for action.

To cushion the shock which otherwise would result from the release of any of the above-described units, spring-controlled damping members may be employed, one suitable for the form of this invention shown in Figure 13 and those preceding being shown in Figure 13b and one suitable for those embodiments shown in Figure 15 and those which follow being shown in Figure 15a.

As shown in Figure 13b, split ring 174 is positively attached to ring 176, but that ring is mounted in tail assembly 171 of bomb 172 by a rod 212 attached to a plunger 213 working against spring 214 in a cylinder 215 in the tail assembly. As the parachute opens, this plunger mechanism will cushion the shock and prevent premature detonation of the bomb or other load.

A similar construction is shown in Figure 15a. Split ring 193 is attached to ring 195 in the manner previously described, but the latter is mounted upon a rod 216 terminating in plunger 217 operating in cylinder 218 and damped by spring 219.

An arrangement alternative to that of Figure 15 is shown in Figures 18 and 18a (Sheet 5).

A compartment 223 in a tail assembly 224 attached to a bomb casing 225 includes a permanently installed case 226 in which is housed all of our releasing mechanism except a cell 227 (and a secondary reflector if desired), the reflecting inner surface of parachute 229 and a cable 230 electrically connecting cell and releasing mechanism. Cell 227 is supported by a short cable 231. This cable is attached to a ring 232 which in turn is supported by auxiliary shrouds 233 extending from parachute 229. The bomb itself however is supported by shrouds 234 which extend from the parachute to a split ring 236 which is operated in the manner previously described.

When the above assembly is released from a plane, a cord 238 attached to a ring 239 corresponding to ring 197 previously described pulls the parachute and cell from housing 223 in the manner previously described. As the parachute opens cord 238 is broken at a weakened portion 241 close to carrier 242. Thereupon cell 227 hangs from the parachute at the focal point of the primary reflector formed by the inner reflecting surface 243 of parachute 229. When this unit passes over a radiating target, current generated by this cell, if a thermo-couple or variations of the current passing therethrough if a bolometer, is transmitted through cable 230 to the releasing mechanism, such as that previously described, placed within housing 226, whereupon split ring 236 opens and the bomb drops.

In the above specification it has been stated that a thermo-couple of any conventional or desired type may be employed, although we prefer to use that described and claimed in the co-pending application of applicant McKay Serial Number 509,530 filed November 8, 1943. Conventional thermo-couples having a sensitivity of thirty microvolts per micro degree, which have long been in use for various purposes, have a sensitivity of many times that which is required for the purposes hereof but are somewhat delicate. Other conventional thermo-couples are sufficiently rugged and relatively inexpensive and while they lack the sensitivity stated above will operate satisfactorily under the impact of radiation from industrial targets. The thermo-couple described in the McKay application, immediately above identified, combines ruggedness and sufficient sensitivity for all purposes hereof and is adapted to mass production and is relatively inexpensive. The term "thermo-couple" is herein used to include a multiple unit known as a thermo-pile.

Instead of a thermo-couple a simple bolometer may be employed if desired. The advantage of a bolometer is that it has very much higher sensitivity, as is required for a comparatively few purposes among those contemplated herein. It is of course understood that a thermo-couple is an instrument which generates electricity under the impact of radiation while a bolometer is a valve which in accordance with the amount of radiation impinging thereupon varies the amount of current already generated by other means which will pass through it. Therefore if a bolometer is used instead of a thermo-couple it must be fed from a battery such as 55, 78, 88 or 144.

Any conventional or desired bolometer, of which many varieties are on the market, may be employed. Although such instruments are well known articles of commerce reference is made to such as are described in "Spectroscopy" by E. C. C. Baly, Longmans Green, London, 1912, pages 31, 250, 253, 271, 274, 279; or in "Heat for Advanced Students" by Edwin Edser, Macmillan, London, Chapter XIX; or in "Light for Students" by the said Edser, Macmillan, London, 1925, pages 216, 217 and 344.

Although in the infra-red region non-selective detectors of radiation are more desirable, under certain conditions use may be made of a photo-electric cell. If so we much prefer one of the thalofide type in which the sensitivity drops at about 12000 Ångstrom units, which is only about 5000 Å beyond the visible limit.

Among the objects of this invention is control of releasing mechanism such as is herein described and claimed in accordance with the amount of radiation from a target or signal. That is to say, we may cause releasing mechanism to operate in response to impact of radiation which is between certain predetermined limits. We may wish to make the apparatus insensitive to impact of radiation below a certain predetermined level so that for one example only a power house of a large factory instead of a railway locomotive will operate the device. A simple and effective device to limit response of this instrument to a signal of relatively high value is shown in Figure 11. Alternatively we may wish to make this releasing mechanism effective following the impact of relatively moderate radiation only and not operative following impact of radiation which is large in quantity. To accomplish both of these ends the electric devices which are described and claimed in the co-pending application of applicant McKay, Serial Number 509,530, filed November 8, 1943 may be employed. In such cases the amplifiers described herein may be modified in accordance with Figure 21 and the corresponding description of said application.

In the specification and claims hereof, we exclude from such terms as "radiation" and "radiation-responsive" electrical waves, as for example those of radio frequency and actuating devices responsive thereto.

In common with other types of bombing, it is assumed that this invention will be practiced at night when radiation reflected from the sun will not be a disturbing factor. It is possible, however, to use this automatic releasing mechanism by day. The optical system which we have described above limits response to radiation emanating from directly below one of our units.

The advantages of our invention include the provision of automatic radiation-responsive method and means whereby without human agency bombs released at a distance from a radiating target may be dropped thereupon without immediate danger to an aircraft and its crew by which the bombs were initially transported to a point adjacent the target. They also include the provision of simple devices responsive to predetermined infra-red signals whereby a load supported by a parachute may be automatically released from its carrier.

Other objects advantages and characteristics of this invention will be apparent from the foregoing specification, the attached drawings and the subjoined claims.

We claim:

1. Mechanism for detachably connecting a load to an air-borne carrier, said mechanism including a mounting and two pivoted control bars, one an attaching bar and the other an armature bar, disposed upon said mounting with ends thereof in engaging right-angled relation to each other, fixtures for attaching the load to one of said bars and said carrier to the other thereof, that fixture attaching the load to said attaching bar being loosely disposed thereabout between the pivot point of said bar and the point of engagement of said two bars so that when said two bars are no longer in engagement it is released therefrom, said armature bar having one portion upon one side of the pivot point which forms an armature of an electro-magnet and another upon the other side of said point which is formed with a plurality of teeth upon different of its sides but in the same plane, said attaching bar having two teeth spaced from each other and projecting therefrom in a horizontal plane each adapted successively to engage with said projections, one of said teeth being so disposed as to engage with teeth upon one side of said pivoted armature bar and the other being so disposed as to engage with teeth upon the other side thereof, an electro-magnet for moving said armature member in one direction, means for actuating said electro-magnet, and means for thereafter moving said armature member in the other direction, said electro-magnet and said means being effective for alternatively engaging and disengaging said projections and said teeth whereby a succession of such movements successively frees said teeth from said projections and after a predetermined number of such movements frees said bars from engagement with each other thereby permitting said fixture engaging said attaching bar to be disengaged therefrom thereby breaking the connection between the load and said carrier and permitting the load to fall but only after a predetermined plurality of movements of said electro-magnet.

2. For use with an air-borne carrier, in combination, a parachute adapted to support operating mechanism and a load after release from the carrier, operating mechanism for releasably connecting said parachute and the load, said mechanism including means for operating said connecting means to release the load, a radiation-responsive member for actuating said operating means, a support by which said mechanism is disposed beneath said parachute, a support by which said actuating member is disposed between said mechanism and said parachute, and means connected with said parachute and operative upon the joint release of said parachute and said mechanism and the load from the carrier for disposing and maintaining said supports in said positions.

3. For use with an air-borne carrier, in combination, a parachute adapted for release from the carrier and thereafter to support a container bearing a load, a container for a load, said container being formed with a housing for a control member, mechanism for releasably connecting said parachute and said container, a control member electrically responsive to radiation for actuating said connecting mechanism to release said container, said member being disposed within said housing before the release of said parachute from the carrier, and means effective upon such release for removing said control member from said housing and for placing and maintaining it in position to receive radiation from points below said parachute whereby upon the impact of radiation therefrom it is enabled to actuate said connecting mechanism which thereupon releases said container.

4. For use with an air-borne carrier and in combination, a parachute adapted for release from the carrier and thereafter to support a load, a container for the load, mechanism for releasably connecting said parachute and said container, a member which is electrically responsive to radiation for actuating said connecting means to release said container, said container being formed with a compartment wherein said parachute and said mechanism may be disposed before the release of said parachute from the carrier, and means rendered effective by the release of said parachute from the carrier for removing said parachute and said mechanism from said compartment and for rendering said parachute operative and said mechanism operable.

5. For use with an air-borne carrier and in combination, a bomb, a parachute, said bomb and said parachute being adapted for joint release from the carrier, and mechanism for releasably connecting said bomb and said parachute for disconnecting said bomb from said parachute after their joint release from the carrier, said bomb being formed with a compartment for housing said mechanism and said parachute before the release of said parachute and said bomb from the carrier and said mechanism including a control member electrically responsive to radiation for operating said mechanism for disconnecting said bomb from said parachute, and means effective upon the joint release of said bomb and said parachute from the carrier for removing said parachute and said member from said compartment whereby said parachute is rendered operative to support said bomb and said member is rendered operable to actuate said mechanism upon the impact of radiation thereupon.

6. For use with an air-borne carrier and in combination, a bomb and a parachute adapted for joint release from the carrier, said bomb being formed with a compartment in the tail thereof and said parachute being adapted to be housed within said compartment prior to such release from the carrier, means effective upon such joint release for removing said parachute from said compartment and rendering it operative to support said bomb, shrouds depending from said parachute, an operable attaching member movable between a closed and an open position, means for relatively fixedly joining said attaching member and said bomb, means for connecting said shrouds and said attaching member when said member is disposed in said closed position, said means being rendered inoperative when said attaching member is moved to open position thereby breaking the support of said member and bomb by said parachute and causing said bomb to fall, an electro-magnetic device for moving said member from closed to open position, a control member electrically responsive to the impact of radiation and electrically connected to said electromagnetic device for operating said device upon such impact, and secondary shrouds for maintaining said control member in spaced relation to said parachute and to said bomb after such joint release of said bomb and said parachute from said carrier in preparation for its operation for releasing said bomb from said parachute.

HERBERT COUCHMAN McKAY.
ANTHONY MARTINEK.
WARREN DUNHAM FOSTER.

REFERENCES CITED

The following references are of record in the file of this patent:

UNITED STATES PATENTS

| Number | Name | Date |
|---|---|---|
| 1,506,785 | Sperry | Sept. 2, 1924 |
| 2,137,598 | Vos | Nov. 22, 1938 |
| 1,894,954 | Johnson et al. | Jan. 24, 1933 |
| 1,403,159 | Hammond | Jan. 10, 1922 |
| 2,255,245 | Ferrel | Sept. 9, 1941 |
| 2,317,256 | DeKurowski | Apr. 20, 1943 |
| 2,349,009 | Schwab | May 16, 1944 |
| 2,144,056 | Halbach | Jan. 17, 1939 |
| 975,281 | Rectenwald | Nov. 8, 1910 |

FOREIGN PATENTS

| Number | Country | Date |
|---|---|---|
| 352,035 | Great Britain | June 22, 1931 |
| 25,355 | Great Britain | Apr. 24, 1913 |